(12) United States Patent
Glose et al.

(10) Patent No.: US 7,305,945 B2
(45) Date of Patent: Dec. 11, 2007

(54) METHOD FOR CHANGING THE LIFT OF AN INLET VALVE OF AN INTERNAL COMBUSTION ENGINE

(75) Inventors: Martin Glose, Affalterbach (DE); Arkadi Kudashev, Erdmannhausen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/274,796

(22) Filed: Nov. 15, 2005

(65) Prior Publication Data

US 2006/0060158 A1    Mar. 23, 2006

Related U.S. Application Data

(63) Continuation-in-part of application No. PCT/EP2004/003338, filed on Mar. 30, 2004.

(51) Int. Cl.
*F01L 1/34* (2006.01)

(52) U.S. Cl. ............... 123/90.15; 123/90.16; 123/346

(58) Field of Classification Search ............. 123/90.15, 123/90.16, 90.17, 90.18, 90.2, 345, 346, 123/347, 348
See application file for complete search history.

(56) References Cited

U.S. PATENT DOCUMENTS 5,009,203 A    4/1991   Seki
5,347,962 A *   9/1994   Nakamura et al. ....... 123/90.16
5,803,029 A    9/1998   Yoshihara et al.
6,615,129 B2 *   9/2003   Kabasin ...................... 701/110
2003/0005908 A1   1/2003   Fujieda et al.

FOREIGN PATENT DOCUMENTS

EP    0 854 273    7/1998

OTHER PUBLICATIONS

MTZ 61(2000) 11 "DerNeue Motor des Porsche 911 Turbo".

* cited by examiner

*Primary Examiner*—Ching Chang
(74) *Attorney, Agent, or Firm*—Klaus J. Bach

(57) ABSTRACT

In a method for changing the lift of inlet valves of an internal combustion engine between a partial lift and a full lift, the lift of the inlet valves being controlled by at least one camshaft, which comprises partial lift cams and full lift cams acting alternatively on the inlet valves, the control times of an inlet valves assigned to the camshaft are adjusted by rotating the camshaft by a certain angle so that the changeover between the partial lift cams and the full lift cams can be carried out at points within a characteristic performance graph of the internal combustion engine at which the suction capacity of the internal combustion engine when using the partial lift cams corresponds essentially to the suction capacity of the internal combustion engine when using the full lift cams.

3 Claims, 1 Drawing Sheet

METHOD FOR CHANGING THE LIFT OF AN INLET VALVE OF AN INTERNAL COMBUSTION ENGINE

This is a Continuation-In-Part Application of International Application PCT/EP2004/003338 filed Mar. 30, 2004 and claiming the priority of German application 103 21 881.5 filed May 15, 2003.

BACKGROUND OF THE INVENTION

The invention relates to a method for changing the lift of inlet valves of an internal combustion engine between a partial lift and a full lift under the control of at least one camshaft having partial lift cams and full lift cams.

Such a method is known from MTZ 61 (2002), pages 730-746. In this method, changeover is effected between an inner tappet and an outer tappet, which are assigned to different cam profiles and act on the inlet valve, by means of a controllable cup tappet. The inner tappet or partial lift cam is designed in such a way that it generates a lift of the inlet valve of roughly 3 mm, whereas the outer tappet or full lift cam generates an inlet valve lift of roughly 12 mm.

For low power requirements of the internal combustion engine, the small inlet valve lift is activated, whereby consumption and emissions are lowered. As soon as the driver of a vehicle in which the internal combustion engine is installed requests a higher torque, changeover takes place to that tappet or cam which generates the larger inlet valve lift.

In this connection, however, it is problematic that, when changing over between the partial lift and the full lift of the inlet valves, a relatively great torque jump occurs because of the much greater cylinder filling via the increased inlet valve flow cross-section which the driver may experience as unpleasant.

In the prior art referred to above, this torque jump is compensated in a relatively complicated way by adaptation of the mixture within the cylinder, by changing the throttle valve angle and by adjusting the ignition angle. Changing the throttle valve angle in particular, and consequently the adaptation of the fresh air mass flow into the internal combustion engine, is a very problematic and complex operation, however, which moreover cannot be carried out within a single load change cycle of the internal combustion engine.

U.S. Pat. No. 5,009,203 describes a method for controlling the valve changeover in an internal combustion engine in which the changeover is to be carried out in such a way that the internal combustion engine delivers essentially the same torque before and after changeover. In order to achieve this, the fuel quantity injected is measured before and after changing over.

The method described therein does not allow independent adjustment of the inlet valve control timing and of the inlet valve lift, however, so that changeover is relatively rigid.

Based on the prior art described in MTZ 61 (2002), it is the object of the present invention to provide a method for changing the lift of inlet valves of an internal combustion engine so that a changeover between a partial lift and a full lift of the inlet valves can be carried out within a very short time and with a great variability with regard to the control time and the valve lift.

SUMMARY OF THE INVENTION

In a method for changing the lift of inlet valves of an internal combustion engine between a partial lift and a full lift, the lift of the inlet valves being controlled by at least one camshaft, which comprises partial lift cams and full lift cams acting alternatively on the inlet valves, the control times of an inlet valves assigned to the camshaft are adjusted by rotating the camshaft by a certain angle so that the changeover between the partial lift cams and the full lift cams can be carried out at points within a characteristic performance graph of the internal combustion engine at which the suction capacity of the internal combustion engine when using the partial lift cams corresponds essentially to the suction capacity of the internal combustion engine when using the full lift cams.

In other words, the suction capacity of the internal combustion engine when using the full lift cams is adapted to the suction capacity of the internal combustion engine when using the partial lift cams. This adjustment of the cam shaft, which can be carried out with conventional continuous camshaft adjusters, for example, is carried out before the inlet valves are changed over from partial lift to full lift or, vice versa, from full lift to partial lift, by virtue of which a torque jump during the subsequent changing over can be avoided. For a smooth change-over, it is necessary that, with the cam profiles and at the relative position of the camshaft phase angle relative to the crank angle of the partial lift cams and full lift cams, the suction capacity of the internal combustion engine is the same irrespective of the use of the partial lift cams or the full lift cams.

The size of the camshaft phase angle over the rotational speed and the load of the internal combustion engine when using the partial lift cams or the full lift cams is stored in a characteristic performance graph within a control device of the internal combustion engine. The dynamic changeover described between the full lift cams and the partial lift cams takes place then by the control device going back to the stored characteristic performance graph values or to the characteristics stored therein and bringing about the mechanical changeover. For this, it is advantageously not necessary to change the position of the throttle valve, that is to carry out temporal precontrol by means of the throttle valve, so that the method according to the invention can be carried out with considerably less outlay than methods known from the prior art. In this connection, it is possible to adjust the lift and the control times of the inlet valves independently of one another, whereby the method according to the invention is made possible in the first place.

The correspondence of the suction capacity of the internal combustion engine can be achieved in an especially simple and advantageous way when using the full lift inlet cam profiles described by shifting the closing time of the inlet valves toward late inlet valve closing. The adjustment of the closing time of the inlet valves toward late inlet closing, leads to a lower suction capacity of the internal combustion engine operated with the full lift cams as the air taken in is to a certain extent pushed out of the cylinders again before the inlet valves close. With corresponding design of the partial lift cams in relation to the full lift cams with the consequence of a greater percentage of the fresh air taken in remaining when the partial lift cam is used, correspondence of the suction capacity concerned can thus be achieved.

The invention will become more readily apparent from the description of a particular embodiment described below with reference to the accompanying drawings:

DESCRIPTION OF A PARTICULAR EMBODIMENT

Figure 1:
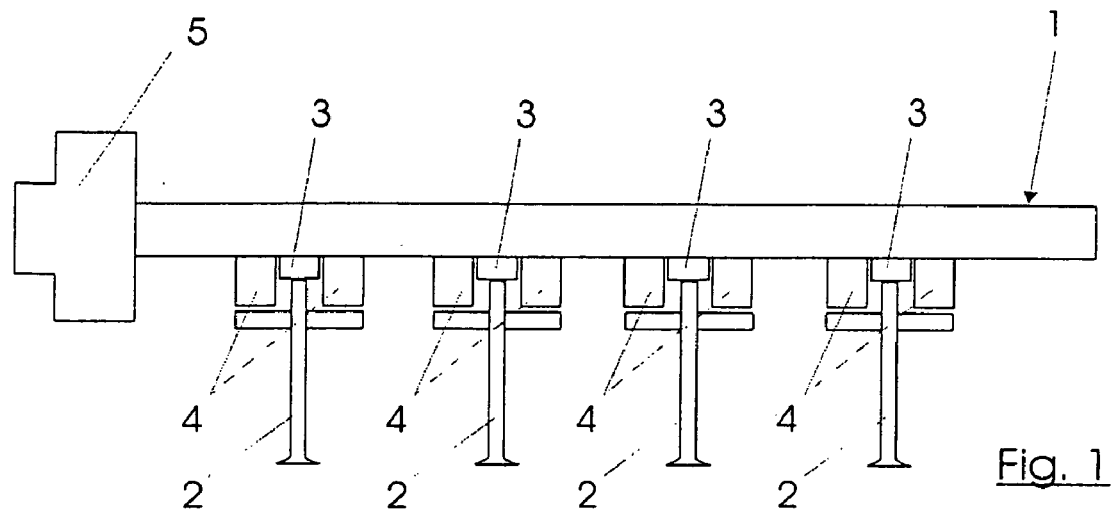
FIG. 1 shows a camshaft, with partial lift cams and full lift cams for controlling the inlet valves of an internal combustion engine.

FIG. 1 shows in a very diagrammatic illustration a camshaft 1 of an internal combustion engine (not illustrated in its entirety). The camshaft 1 serves for activating a number of inlet valves 2 which in a way known per se control the inflow of air or of a fuel/air mixture to cylinders (likewise not illustrated) of the internal combustion engine. In the present case, the engine is a V8 engine with two camshafts 1 for altogether eight or sixteen inlet valves 2. The internal combustion engine also comprises outlet valves and a camshaft for controlling the same, but these are, for reasons of clarity, not illustrated.

In order to provide different lift levels for the inlet valves 2, the camshaft 1 comprises a number of partial lift cams 3 and a number of full lift cams 4, between which changeover can take place in order to bring them alternatively into engagement with the inlet valves 2. When the partial lift cams 3 are in engagement with the inlet valves 2, the valve lift is roughly 3 mm; when the full lift cams 4 are in engagement with the inlet valves 2, the lift of the latter is roughly 12 mm. The changeover between the partial lift cams 3 and the full lift cams 4 is known per se from MTZ 61 (2000), pages 730 to 746, for example, and is therefore not explained in greater detail below. In this connection, the partial lift cams 3 and the full lift cams 4 are in each case assigned in pairs to one of the inlet valves 2, the full lift cams 4 being of two-part construction and located at opposite sides of the partial lift cams 3 in the present case.

The point of this changeover between the partial lift cams 3 and the full lift cams 4 is, that with a low power requirement of the internal combustion engine, the inlet valves can be opened with only the small inlet valve lift by means of the partial lift cams 3, whereby a reduction in consumption and emissions can be achieved. When higher torques are requested, changeover takes place to the larger inlet valve lift by means of the full lift cams 4.

At one end of the camshaft 1, an adjusting device 5 illustrated in greatly simplified form is provided, which is capable of adjusting the angular position or the phase angle of the camshaft 1 relative to the crankshaft and in this way ensures that the control times of the inlet valves 2 can be changed. The mode of functioning of the adjusting device 5 is likewise known from the prior art and is not described in greater detail below.

Figure 2:
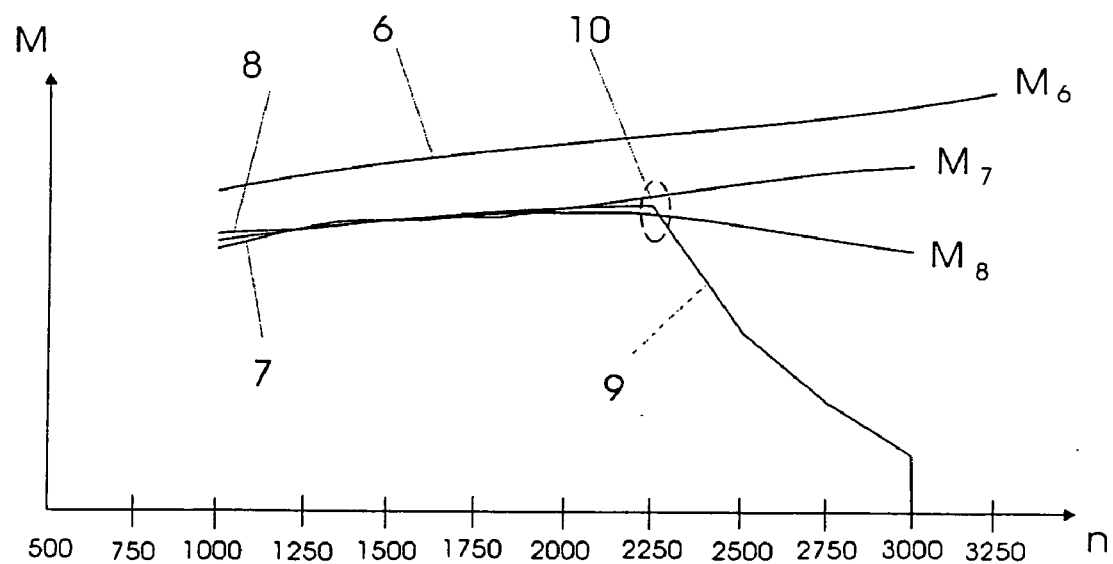
FIG. 2 shows a diagram which illustrates the course of different torques of an internal combustion engine over the rotational speed of the same.

FIG. 2 illustrates a diagram in which different characteristics of a torque M are plotted over a rotational speed n of the internal combustion engine. In this connection, attention is to be paid to the fact that the torque M is in a first approximation proportional to the suction capacity of the internal combustion engine, that is the air volume made available to the internal combustion engine related to the displacement thereof, so that the curves illustrated essentially also represent the course of the suction capacity of the internal combustion engine over the rotational speed n. In this connection, the size of the torque M is not indicated as this is naturally highly dependent on the internal combustion engine. The values indicated for the rotational speed n are also to be regarded merely as examples.

By rotating the entire camshaft 1 by means of the adjusting device 5, the control times of the inlet valves 2 are set in such a way that the dynamic changeover between the partial lift cams 3 and the full lift cams 4 is carried out at points within the characteristic map of the internal combustion engine at which the suction capacity of the internal combustion engine when using the partial lift cams 3 corresponds essentially to the suction capacity of the internal combustion engine when using the full lift cams 4. As a result, this change-over is not noticeable for the driver of a motor vehicle in which the internal combustion engine is installed; the changeover can consequently not be experienced as annoying. First, a suitable relative angular position of the partial lift cams 3 to the full lift cams 4 is determined, and then a certain angle of the camshaft 1 is set by means of the adjusting device 5.

In this connection, the characteristic or curve designated by "6" shows the maximum torque $M_6$ which is obtained with full lift, that is when the full lift cams 4 are in use or in engagement with the inlet valves 2, and with optimal filling control times of the inlet valves 2. In this connection, the adjusting device 5 can adjust the camshaft 1 in such a way, for example, that the inlet valves 2 close earlier with normal setting of the camshaft adjuster by 42° than with a camshaft adjuster late setting. The term "optimal-filling control times" may of course differ from internal combustion engine to internal combustion engine but is perfectly comprehensible for an expert.

The curve designated by "7" shows the torque $M_7$ which is obtained when the full lift cams 4 are used for the actuation of the inlet valves 2, the control times of the inlet valves 2 being changed in such a way, however, that part of the air introduced or of the fuel/air mixture introduced is expelled from the cylinders again, so that the volumetric efficiency, that is the result of air mass taken in minus air mass expelled, is reduced. For this, the camshaft 1 is in the present case adjusted toward late inlet valve closing by means of the adjusting device 5.

The curve designated by "8" shows the maximum torque $M_8$ when using the partial lift cams 3 with optimal filling control times of the inlet valves 2. It can be seen that the curve 8 runs very close to the curve 7 and even intersects it several times. This is achieved by means of the shifting of the control times for the full lift cams 4, described above with reference to the curve 7, as the intake capacity and consequently the torque of the internal combustion engine is reduced by the expulsion of the air introduced or of the fuel/air mixture from the cylinder. AL points at which the curve 8 lies above the curve 7, the control time of the full lift cams 4 can be optimized to a small extent and the torque can thus be increased by rotating the camshaft 1 before a changeover, so that it the curves 7 and 8 are caused to intersect.

If, as in the present case, this is coordinated in such a way that, when the full lift cams 4 are used, the suction capacity lies in the range of, or in some cases slightly below and in some cases slightly above, the suction capacity available with the use of the partial lift cams 3, changing over between the partial lift cams 3 and the full lift cams 4 can be carried out essentially without torque jump.

In this respect, the curve designated by "9" represents a changeover line on which a changeover operation from the partial lift cams 3 to the full lift cams 4 or vice versa can be carried out. Up to a point designated by "10" at a rotational speed n of roughly 2250 rpm, this changeover is possible with a torque jump of less than 15 Nm, that is generally in a range of less than 5%, and is initiated automatically by the control device of the internal combustion engine depending on changeover points in the engine characteristic performance graph which can be stored in the control device.

At a rotational speed n above the point designated by "10", the air mass supplied is limited by means of a throttle valve (not illustrated) or similar in the intake region of the internal combustion engine in order to bring about by this reduction of the air mass or air volume a reduction in the difference of the torques M generated by the partial lift cams 3 or the full lift cams 4 to roughly 15 Nm. In this case, the changeover line between the partial lift cams 3 and the full lift cams 4, that is between partial lift and full lift of the inlet valves 2, is therefore shifted by throttling the air supplied. This is shown by the falling of the line 9 as from the rotational speed n of 2250 rpm.

This also shows that, below the changeover line 9 within the characteristic performance graph for the torque M and the rotational speed n, changeover can be effected at any point with the inlet camshaft phase angles described in greater detail above which are necessary for torque-neutral changeover and are stored in characteristic performance graph for load and rotational speed in the control device.

What is claimed is:

1. A method for changing the lift of inlet valves of an internal combustion engine between a partial lift and a full lift, the lift of the inlet valves being controlled by at least one camshaft, which comprises respective partial lift cams and full lift cams acting alternatively on the inlet valve depending on whether the partial lift cams or the full lift cams engage the inlet valves, and the control times of all the inlet valves assigned to the camshaft being adjusted by rotating the camshaft by a given angle, said method comprising the steps of setting the control times of the inlet valves (2) by rotating the camshaft (1) in such a way that a changeover between the partial lift cams (3) and the full lift cams (4) occurs at points within a characteristic performance graph of the internal combustion engine at which the suction capacity of the internal combustion engine when using the partial lift cams (3) corresponds essentially to the suction capacity of the internal combustion engine when using the full lift cams (4).

2. The method as claimed in claim 1, wherein the correspondence of the suction capacity of the internal combustion engine when using the partial lift cams (3) and when using the full lift cams (4) is achieved by shifting the closing time of the inlet valves (2) toward late inlet closing.

3. The method as claimed in claim 1, wherein the changeover is carried out within a difference of the suction capacity of the internal combustion engine of roughly 5%.

* * * * *